(No Model.)
G. H. PFEIFER.
COFFEE ROASTER.
No. 279,179. Patented June 12, 1883.
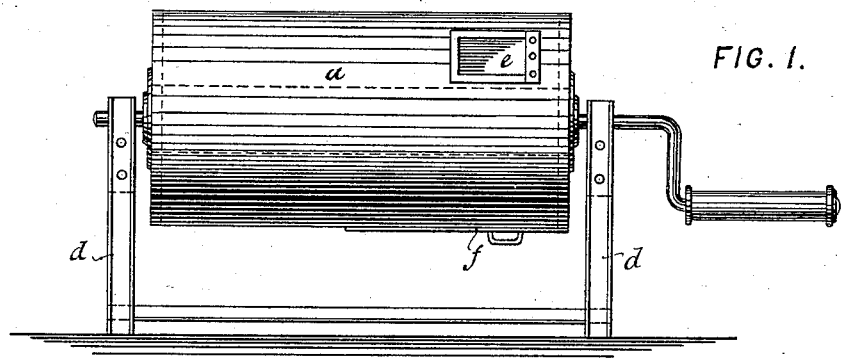
FIG. 1.
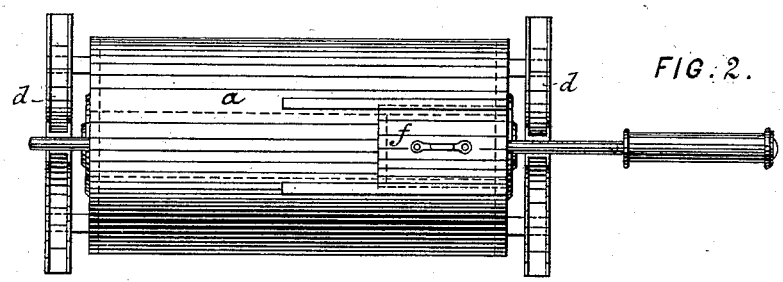
FIG. 2.
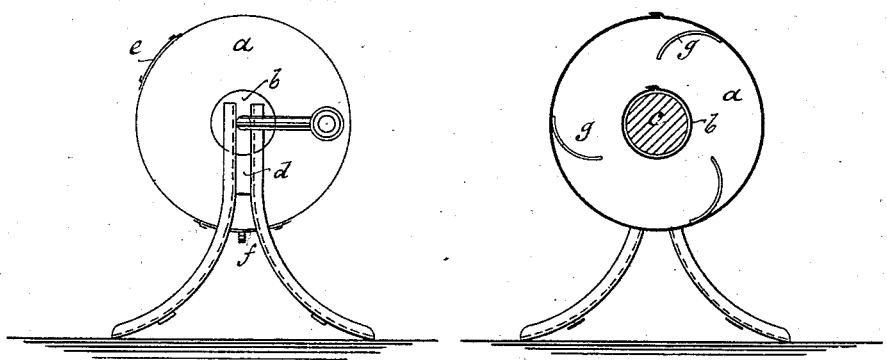
FIG. 3.   FIG. 4.
FIG. 5.
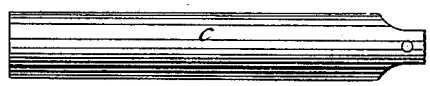
Witnesses.
Edwin A. Finckel.
Geo. M. Finckel.
Inventor.
Gustav Heinrich Pfeifer
by Wm. H. Finckel
atty.
N. PETERS, Photo-Lithographer, Washington, D. C.

UNITED STATES PATENT OFFICE.

GUSTAV H. PFEIFER, OF FREIBERG, SAXONY, GERMANY.

COFFEE-ROASTER.

SPECIFICATION forming part of Letters Patent No. 279,179, dated June 12, 1883.

Application filed February 28, 1883. (No model.)

*To all whom it may concern:*

Be it known that I, GUSTAV HEINRICH PFEIFER, of the city of Freiberg, in the Kingdom of Saxony and German Empire, have invented certain new and useful Improvements in Coffee-Roasters, of which the following is a specification.

My invention relates to improvements in coffee-roasters; and it consists in supplying the necessary heat to a coffee-roaster by means of a glowing bolt or rod introduced into and within the hollow axle or shaft of the drum of said roaster.

In the accompanying drawings, illustrating my invention, and forming part of this specification, Figure 1 is a side elevation; Fig. 2, a top plan view with the cylinder reversed from Fig. 1; Fig. 3, an end view; Fig. 4, a central vertical cross-section of my coffee-roaster, and Fig. 5 a detail plan view of the heating-bolt.

Similar letters of reference indicate like parts in the several figures.

In practicing my invention I make use of a drum or cylinder, $a$, of sheet-iron or other suitable material. The axis $b$ of the said drum or cylinder $a$ consists of a hollow cylinder, of sheet-iron or other suitable metal, in which a steel bolt or rod, $c$, previously heated to red or white heat, is inserted. The drum or cylinder $a$ is rotated by means of a suitable crank, and is mounted on a suitable frame, $d$.

In order to be able to manipulate the glowing bolt or rod $c$, I employ a suitable hook, which is inserted in a hole or boring in one end of the bolt or rod $c$, arranged for such said purpose.

E is a glass slide, so that the progress of the roasting can be observed.

$f$ is a slide for filling and emptying the drum $a$.

$g\ g$ are projecting wings for turning the coffee in the drum $a$.

The operation of the roaster is extremely simple. The same requires no special heating, occupies a very small space, and the roasting can be carried on in any suitable place.

I am aware that it is not new to provide a coffee-roaster with a hollow shaft conveying heat from a fire into such roaster; and I am also aware that it is old to make a coffee-roaster with a hollow shaft which rotates about a fixed grate; and I am further aware that it is old to make a hollow shaft in a coffee-roaster, in which shaft a slide is arranged, by which slide samples of coffee may be removed to ascertain the progress of the browning without uncovering the whole roaster. I therefore do not broadly claim a coffee-roaster having a hollow shaft through which heat is introduced into the coffee-containing cylinder, but I limit my invention to supplying heat to a coffee-roaster by means of a glowing metal bolt introduced in a hollow shaft of the roaster, whereby the advantages above specified are gained.

Having now described my said invention, and the manner in which the same is to or may be carried into effect, I desire it to be understood that what I claim, and desire to secure by Letters Patent, is—

The drum of a coffee-roaster, provided with a hollow axle, combined with a glowing bolt or rod for supplying heat to said drum, substantially as and for the purpose described.

GUSTAV HEINRICH PFEIFER.

Witnesses:
 OTTO WOLFF,
 GUSTAV MATTFALS.